Oct. 5, 1965     G. D. BOYD ETAL     3,210,687
SOLID-STATE, CONTINUOUS WAVE OPTICAL MASER
Filed Dec. 22, 1961
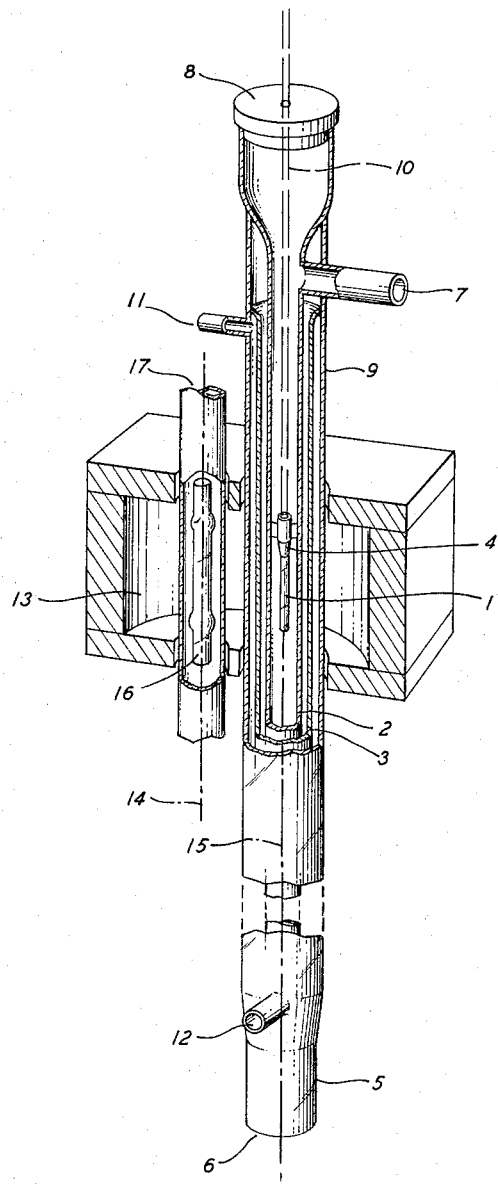
INVENTORS G. D. BOYD
L. F. JOHNSON
BY
ATTORNEY 3,210,687
SOLID-STATE, CONTINUOUS WAVE OPTICAL
MASER
Gary D. Boyd, Murray Hill, and Leo F. Johnson, Plainfield, N.J., assignors to Bell Telephone Laboratories, Incorporated, New York, N.Y., a corporation of New York
Filed Dec. 22, 1961, Ser. No. 161,569
8 Claims. (Cl. 331—94.5)

This invention relates to optical masers and more particularly to solid state optical masers for continuous wave operation.

Recently, considerable attention has been focused on a new class of solid state maser devices which are capable of generating or amplifying coherent electromagnetic wave energy in the optical frequency range. Devices of this type, which are described, for example, in United States Patent 2,929,922 to Schawlow and Townes, are considered to be operable over the spectral range from far infrared to ultraviolet, a bandwidth of about $10^{15}$ cycles. Such a band width is capable of providing a great number of new communications channels thereby multiplying the number of available channels which has heretofore been limited by the characteristics of the lower frequency portions of the spectrum.

Typically, a maser of the type known in the art employs an active material characterized by a plurality of distinct energy levels, the separation of these levels corresponding to frequencies within the desired operating frequency ranges. More particularly, the separation between two of the energy levels $E_1$ and $E_2$ corresponds to quantized wave energy having a frequency $\nu_{12}$ given by Bohr's equation $$\nu_{12} = \frac{E_2 - E_1}{h}$$

where $h$ is Planck's constant.

In accordance with the maser principle, wave energy in an appropriate frequency range is applied to an ensemble of paramagnetic ions, thereby "pumping" electrons from a lower energy level to a metastable higher lever. The excited electrons tend to remain in the upper level for a short time before decaying or relaxing to the lower level. The downward transition is normally accompanied by the radiation of wave energy of the frequency corresponding to separation between the energy levels concerned. During maser operation sufficient pump power is supplied to the active medium to produce, at least intermittently, a nonequilibrium population distribution between the pair of energy levels. More particularly, the population of the upper level is increased with respect to that of the lower level. When the population of the upper level exceeds that of the lower level, a population inversion or negative temperature is considered to obtain. Operation of the maser is dependent upon the fact that a small signal at the proper frequency acts to stimulate the downward transition of the excited electrons from the metastable state, and that the stimulated emission is coherent and in phase with the signal. As pump energy cannot in general be conveniently supplied at a rate sufficient to maintain the excess population of the metastable level, masers of this type appear limited to intermittent or pulsed operation. For communications applications, however, it is considered highly desirable that the coherent maser output be a continuous wave.

Among the more promising forms of optical maser for continuous wave operation are those which utilize an active medium characterized by first, second and third successive electron energy levels. Typically, in optical maser materials the upper level is relatively broad and in some cases is best described as a band. Some materials are characterized by a plurality of relatively sharp absorption lines in the pump band. Continuous wave operation of such three-level devices may be achieved, for example, by pumping electrons from the first to the third level from which they relax spontaneously, by nonradiative processes, to the second level, thereby producing the desired population inversion between the second and first levels. Advantageously, in masers of this type, the relaxation time between the third and second levels is shorter than that between the second and first levels so that the population of the second level may be continuously maintained during operation of the device. Additionally, as the magnitude of the negative temperature attained depends on the relative populations of the first and second levels, the energy level system of preferred materials also include mechanisms which continuously depopulate the terminal state of the optical transition. For example, much attention recently has been directed at the solid materials in which the terminal state $E_1$ of the maser transition lies somewhat above the ground state and has, therefore, a negligible population under equilibrium conditions. During operation of the maser, electrons reaching the terminal state continuously and spontaneously relax to the ground state. Thus, the population inversion is maintained at a relatively high value and maser action is facilitated.

Recently discovered optical maser materials having the above-described type of energy level systems are disclosed in the following copeneding applications assigned to the assignee hereof: Ser. Nos. 153,603, 153,605, 153,606, 153,607 and 153,604, all filed Nov. 20, 1961, and No. 139,266, filed Sept. 19, 1961. These include a calcium tungstate host lattice in which a portion of the calcium ions have been replaced by one of the paramagnetic trivalent ions, neodymium, thulium, praseodymium or holmium. Other host lattices in which trivalent neodymium has been used are strontium molybdate and calcium fluoride. Optical maser action has been achieved in these materials at pump power thresholds significantly lower than that required by ruby, for example. Nevertheless, solid state optical masers have heretofore been limited to pulsed or intermittent operation. Continuous wave operation has been achieved only in optical masers using active media comprising a mixture of helium and neon. Gaseous optical masers of this type are disclosed in copending application Ser. No. 816,276 of A. Javan filed May 27, 1959, assigned to the assignee hereof and now abandoned.

The output power of optical masers employing gaseous media is relatively limited due to the low densities of the atoms which may be excited to produce the required negative state. Continuous high power optical masers of convenient physical size appear to require active media of high density such as the solid materials described in the above-mentioned copending applications. Continuous wave operation of solid state optical masers, however, though long sought by workers in the art, has not been achieved heretofore. The coherent output of solid state devices has been found to be intermittent even under conditions previously considered to be optimum. At best, coherent operation has been achieved for periods that are but fractions of a second. Such an output is considered disadvantageous for communications purposes.

It is an object of this invention to generate continuous wave coherent electromagnetic energy in the optical portion of the spectrum.

It is also an object of the present invention to provide a solid state optical maser for continuous wave operation.

These and other objects of the invention are realized in an illustrative embodiment thereof comprising an optical maser having an active medium consisting essentially of paramagnetic ions in a crystalline host lattice.

In accordance with one aspect of the invention it has been discovered that continuous wave operation of solid state optical masers is severely inhibited by the presence of ultraviolet radiation in the energy supplied by the pump source.

It is a feature of the invention that the pump energy applied to the active media is substantially restricted to wavelengths longer than the ultraviolet.

The above-mentioned as well as other objects and features of the invention will be fully understood from the following more detailed discussion taken in conjunction with the accompanying drawing in which:

The figure is a cutaway perspective view of an illustrative embodiment of the invention.

There is shown in the drawing a solid state optical maser in accordance with the invention comprising a rod shaped crystalline active medium 1 having confocal spherical end surfaces. The energy level system of the crystal 1 is preferably characterized by first, second and third successively higher electron energy levels. As has been indicated, the third level may actually be a broad band or even a plurality of relatively closely spaced levels. It is desirable that the first level lie somewhat above the ground state and, further, that it have a negligible population at the operating temperature of the device. Electrons may then be pumped from the ground state to the third level, from which they relax to the metastable second level. A population inversion is thus produced between the first and second energy levels. The ends of the crystal 1 advantageously are provided with reflective coatings which define an optical cavity resonator as taught in United States Patent No. 3,055,257, issued Sept. 25, 1962. At least one of the reflective coatings is partially transmissive to permit the emergence of the coherent beam of stimulated emission 10. The crystal 1 is mounted in a holder 4 which is positioned inside of an elongated Dewar flask 5 having an inner wall 2 and an outer wall 3. The holder 4 may have a plurality of vanes or projections which contact the inner wall of the flask 5 without obstructing the movement of a coolant past the crystal 1. The Dewar, which is advantageously maintained in a vertical position to facilitate the flow of the coolant, has an opening 6 at the lower end and an opening 7 at the upper end so that a cooling medium may be circulated therethrough. One end of the Dewar 5 is provided with a window 8 through which the coherent light beam may emerge. The portions of the walls 2 and 3 of the Dewar 5 adjacent the crystal 1 are transparent to light of the pump frequency. The outer wall 3 of the Dewar 5 is enclosed by a transparent member 9 which forms a jacket for holding a suitable liquid filter for the purpose to be described herein. Openings 11 and 12 at opposite ends of the filter jacket allow the liquid to be circulated therethrough. Surrounding the enclosed crystal 1 is an elliptical reflector 13 characterized by two separated optical foci 14 and 15. The crystal is positioned at the focus 15 of the ellipse and a gaseous discharge lamp 16 is situated at the focus 14. In this way the major portion of the light emitted by the lamp 16 is focussed on the rod 1.

The lamp 16 provides a source of pump energy for creating the required population inversion among the energy levels of the crystal 1. It is well known that the output of the lamp 16 must be sufficiently intense in the pump band to excite large numbers of electrons to the upper energy level of the medium 1. More particularly, the rate of excitation must be sufficient to overcome the competing phenomena of relaxation and spontaneous emission which tend to return the population distribution to equilibrium. The lamp 16, which may be, for example, a mercury vapor or xenon lamp, is advantageously surrounded by a water jacket for cooling purposes. In addition to cooling the lamp, the water jacket absorbs a substantial amount of the infrared radiation emitted, thereby reducing the amount of heat produced in the crystal 1.

The choice of a pump source is generally made on the basis of the power available in the frequency range corresponding to the pump band of the active medium. In many of the known solid state optical maser media, maser action is initiated at pump power thresholds which are quite high. As pump sources are not presently available which emit efficiently in a limited portion of the spectrum, it is usually necessary to rely on sources which emit over a broad spectral range but which have sufficient intensity in the pump band. Mercury and xenon lamps have been widely used to pump optical masers. The relative inefficiency of the pump sources has made it impracticable to achieve maser action in many substances.

Moreover, it has been found that prior solid state optical maser media even when characterized by a relatively low threshold can be operated only on a pulsed or intermittent basis. In part the intermittency has been due to heating of the crystal by extraneous radiation from the pump source. Heat has the effect of broadening the maser emission line and also contributes to an increase in the threshold at which maser action commences. An increase in the threshold is brought about by the increasing population of the terminal energy level of the optical transition as the temperature is increased. Thus prior approaches to achieving continuous operation have involved steps intended to conduct heat way from the crystal, for example, by immersing it in a coolant. In addition, significant reductions in the threshold may be achieved by making the crystal of a geometry which improves thermal contact between the active medium and the coolant. Such steps have lowered the thresholds for materials which are capable of operation at room temperature and also have permitted the operation at cryogenic temperatures of materials which, due to their normally high thresholds, are incapable of maser action at room temperature.

It has been found that during the operation of solid state optical masers on an intermittent basis, using a pump source which produces a significant amount of ultraviolet radiation, the threshold at which maser action commences tends to increase with successive pulses. Furthermore, the threshold does not decrease even when the solid state medium is allowed to return to thermal equilibrium at very low temperatures. The threshold can be lowered to its original value, however, by annealing the crystal, that is, by first warming it then cooling it to the operating temperature. Our invention is based on our discovery that continuous operation of solid state optical masers is severely inhibited by the presence of ultraviolet radiation in the pump light.

In accordance with one feature of the invention, a filter is provided which absorbs ultraviolet radiation produced by the broad band pump source and which permits only radiation of longer wavelengths to reach the active medium. In effect, continuous operation is achieved by providing a pump source which emits intense radiation at wavelengths longer than the ultraviolet. It is believed that ultraviolet radiation inhibits continuous operation when it is absorbed by elcetrons which have been excited to upper energy levels by the light wave energy in the pump band. These doubly-excited electrons apparently are raised to the conduction band of the active medium and subsequently are trapped by imperfections in the crystal, thereby forming color centers. Imperfections capable of trapping electrons may be in the form of interstitial ions or vacancies in the crystal lattice. Other possibilities include clusters of interstitial ions or of vacancies, or both. Furthermore, electrons may be trapped by chemical impurities in the crystal and possibly by dislocations in the crystal structure. The removal of the electrons from the upper energy levels of the active medium effectievly reduces the magnitude of the population inversion which is essential for maser operation and thus raises the threshold at which stimulated emission is produced.

In the absence of pump sources which emit with sufficient intensity in the pump band without simultaneously emitting in the ultraviolet, it is necessary to use filters to achieve the objects of the invention. A suitable filter which strongly absorbs radiation of wavelengths shorter than about 4,000 Angstroms while freely passing radiation of longer wavelengths is a concentrated water solution of sodium nitrite. By irradiating the maser crystal with pump light which is substantially free of ultraviolet energy, the intermittence of the coherent output beam is eliminated. Continuous operation of a solid state optical maser such as that illustrated in the figure has been achieved with an active medium comprising a calcium tungstate crystal in which a portion of the calcium ions have been replaced by trivalent neodymium ions. The crystal may be maintained at cryogenic temperatures by introducing liquid oxygen precooled by liquid nitrogen into the Dewar flask 5 through the opening 6 at the bottom thereof and circulating it up and around the crystal 1 and out through the opening 7 at the top of the flask. By pre-cooling the liquid oxygen, bubble formation around the crystal is limited and a larger proportion of the pump light reaches the active medium. Simultaneously, a solution of sodium nitrite is circulated through the filter jacket formed by the member 9 and the outer wall 3 of the Dewar flask. If it is desired to operate at normal temperatures, water or even air may replace the pre-cooled liquid oxygen.

Although the invention has been described with particular reference to an illustrative embodiment thereof, many modifications and variations are possible and may be made by those skilled in the art without departing from its scope and spirit.

What is claimed is:

1. A continuous wave solid state maser comprising; means forming an optical frequency resonator for resonating optical wave energy and for coupling optical wave energy out of said resonator, an active maser material disposed within said resonator; said material characterized by an energy level system including a pump band within a portion of the optical frequency range, a metastable energy level between said pump band and a ground state, and a terminal state between said metastable energy level and said ground state, said material further characterized in that the relaxation time between said pump band and said metastable energy level is shorter than the relaxation time between said metastable energy level and said terminal state, and in that the rate of relaxation between the terminal state and the ground state is shorter than the rate of population build-up in the terminal state due to maser action, and means for continuously pumping said material with wave energy restricted to wavelengths longer than ultraviolet.

2. A solid state optical maser as claimed in claim 1 wherein said pump wave energy is substantially restricted to wavelengths longer than 4,000 Angstroms.

3. A solid state optical maser as claimed in claim 1 wherein said pump band is in the visible portion of the optical spectrum.

4. A continuous wave solid state maser comprising; means forming an optical frequency cavity resonator for resonating optical wave energy and for coupling optical wave energy out of said cavity, an active maser material disposed within said cavity, said material characterized by an energy level system including a pump band within a portion of the optical frequency range, a metastable energy level between said pump band and a ground state, and a terminal state between said metastable energy level and said ground state, further characterized in that the relaxation time between said pump band and said metastable energy level is shorter than the relaxation time between said metastable energy level and said terminal state, and in that the rate of relaxation between the terminal state and the ground state is shorter than the rate of populaion build-up in the terminal state due to maser action, a source of continuous pump wave energy comprising a gaseous discharge lamp, means for directing said pump energy into said material for producing a population inversion therein, and filter means interposed between said pump source and said material for substantially eliminating the ultraviolet energy incident thereon.

5. A solid state optical maser as claimed in claim 4 wherein said filter means includes a water solution of sodium nitrite.

6. A solid state optical maser as claimed in claim 4 wherein said active material comprises trivalent neodymium ions in a calcium tungstate host lattice.

7. A solid state optical maser as claimed in claim 4 wherein said active material comprises one of the group consisting of trivalent holmium ions in a calcium tungstate host lattice and trivalent thulium ions in a calcium tungstate host lattice.

8. A solid state optical maser as claimed in claim 4 wherein said active material comprises trivalent neodymium ions in a strontium molybdate host lattice.

References Cited by the Examiner

Johnson et al.: Proceedings of the IRE, vol. 49, No. 11, November 1961, pps. 1704 to 1706.

Johnson et al.: Proceedings to the IRE, vol. 50, No. 2, February 1962, p. 213.

Kaiser et al.: Fluorescence and Optical Maser Effects in $CaF_2$:Sm+2, Physical Review, vol. 123, No. 3, Aug. 3, 1961, pp. 771 and 772 relied on.

Kroger: Some Aspects of the Luminescence of Solids, Elsevier Publishing Co., New York, 1948, pp. 52 and 136 to 144 relied on.

Van Uitert et al.: Single Crystal Tungstates for Resonance and Emission Studies, J. App. Physics, vol. 31, No. 2, February 1960, pp. 328 to 330.

JEWELL H. PEDERSEN, *Primary Examiner*.

FREDERICK M. STRADER, *Examiner*.